United States Patent [19]
Salibra

[11] Patent Number: 5,685,517
[45] Date of Patent: Nov. 11, 1997

[54] STAND FOR REMOVABLY MOUNTING POLE SUPPROTED FURNITURE TO A DECK

[76] Inventor: Joseph Salibra, 407 Churchill La., Fayetteville, N.Y. 13066

[21] Appl. No.: 576,569

[22] Filed: Dec. 21, 1995

[51] Int. Cl.$^6$ ............................................. A01K 97/10
[52] U.S. Cl. .................. 248/519; 248/539; 248/229.1; 135/16; 135/27
[58] Field of Search ............................. 248/539, 519, 248/205.5, 156, 70.2, 910, 511, 346.01, 544, 229.16, 540; 411/84, 85, 342; 52/698, 27, 39; 135/16, 27, 116

[56] References Cited

U.S. PATENT DOCUMENTS

| | | | |
|---|---|---|---|
| 162,553 | 4/1875 | Hood. | |
| 194,169 | 8/1877 | Pettibone. | |
| 278,973 | 6/1883 | Kizer. | |
| 1,162,608 | 11/1915 | Baldwin | 248/540 |
| 2,634,740 | 10/1949 | Duke | 135/6 |
| 3,568,963 | 3/1971 | Koskenin. | |
| 4,286,409 | 9/1981 | Taylor et al. | 47/40.5 |
| 4,582,287 | 4/1986 | Deleary | 248/519 |
| 5,120,016 | 6/1992 | Dysarz | 248/539 |
| 5,176,365 | 1/1993 | Best | 254/342 |

Primary Examiner—Ramon O. Ramirez
Assistant Examiner—Charles J. Hunter

[57] ABSTRACT

The present invention is essentially comprised of a deck furniture mounting stand which is removably attachable to a deck's boards. By loosening or tightening nuts threadingly engaging a pair of mounting rods, the stand may be removed from, or affixed to, respectively, a deck. The stand of the present invention includes a base portion having an upper surface, a lower, deck contacting surface, and a predetermined periphery defined by a continuous edge. A cylindrical, pole (umbrella pole for instance) receiving member having a bored hole formed therein for reception of the pole is positioned in centrally, upwardly extending relation to the upper surface. Further included are two apertures formed through the base on opposite sides of the pole receiving member to receive the mounting rods which secure the stand to the decking. The mounting rods are each comprised of a linear, threaded shaft portion which terminates in a first end, and an opposite second end formed in the shape of a loop having deck engaging burrs integral therewith. The burrs penetrate the deck to provide extra support to the stand. The first end extends upwardly through the aperture and includes a nut threaded thereon to prevent the rod from falling away from the base. The loop of the second end is of a thickness smaller than the width of the spacing between two adjacent deck boards, and a width greater than that of the deck's spacing.

16 Claims, 5 Drawing Sheets

1

STAND FOR REMOVABLY MOUNTING POLE SUPPROTED FURNITURE TO A DECK

BACKGROUND OF THE INVENTION

The present invention generally relates to stands for mounting umbrellas, flags, or other pole supported furniture to decks, and more particularly to stands for preventing movement of deck umbrellas or other furniture in gusty winds, or other turbulent weather.

Umbrellas, or other pole supported furniture, mounted on decks have commonly been used to provide shade and cover for people relaxing on their decks. Most often these umbrellas are mounted in stands which sit flat on the deck's surface. Umbrellas provide particular problems. Due to the umbrella's shape, wind often produces extreme upwardly and laterally directed forces against the umbrella. These forces, in turn, will frequently cause the umbrella and stand to be blown from their original position. Moreover, if the wind is strong enough, the umbrella and stand may be blown over and thrown against the house, causing damage thereto.

The traditional solution to this problem is to make the stand out of very heavy metal or concrete, or to fill a hollow stand with sand, rocks, or other granular material. While preventing the umbrella and stand from being blown around, this solution creates other problems. For instance, because the stand is of such extreme weight, many people are not strong enough to move it from one location on the deck to another. Nor are many people able to remove the stand from the deck to place it in storage, or elsewhere.

Accordingly, it is a principal object of the present invention to provide a deck umbrella mounting system which is lightweight and easily manipulable to prevent the umbrella, or other furniture, and its stand from being blown over by the wind.

It is another object of the present invention to provide a deck furniture mounting system which is inexpensive to manufacture.

Other objects and advantages of the present invention will in part be obvious, and in part appear hereinafter.

SUMMARY OF THE PRESENT INVENTION

In accordance with the foregoing objects and advantages, the present invention is essentially comprised of a deck furniture mounting stand which is removably attachable to a deck's boards. By loosening or tightening nuts threadingly engaging a pair of mounting rods, the stand may be removed from, or affixed to, respectively, a deck.

The stand of the present invention includes a base portion having an upper surface, a lower, deck contacting surface, and a predetermined periphery defined by a continuous edge. A cylindrical, pole (umbrella pole for instance) receiving member having a bored hole formed therein for reception of the pole is positioned in centrally, upwardly extending relation to the upper surface. Further included are two apertures formed through the base on opposite sides of the pole receiving member to receive the mounting rods which secure the stand to the decking.

The mounting rods are each comprised of a linear, threaded shaft portion which terminates in a first end, and an opposite second end formed in the shape of a loop having deck engaging burrs integral therewith. The burrs penetrate the deck to provide extra support to the stand. The first end extends upwardly through the aperture and includes a nut threaded thereon to prevent the rod from falling away from the base. The loop of the second end is of a thickness smaller than the width of the spacing between two adjacent deck boards, and a width greater than that of the deck's spacing.

Therefore, to secure the stand to a deck, the looped second ends of the mounting rods are passed between the space between two of the deck's boards; the mounting rods rotated about 90 degrees to position the loops in perpendicular relation to the boards; and the nuts are then tightened until the looped second end is firmly abutted against the lower surface of the deck's boards with the burrs penetrating into the boards. It is preferable for the loop to extend as close as possible to perpendicular to the boards, thereby ensuring a secure abutment.

The stand may be easily, laterally moved within the same two boards by slightly loosening the nuts. The loosened nuts will take the loops out of abutting relation to the board's lower surfaces, and the stand may be slid along the boards. When repositioned as desired, the nuts may be retightened. The stand may be easily removed from the deck in the same manner, except for also requiring the mounting rods to be rotated to permit them to be passed through the spacing between the boards.

The present invention would work equally as well with the second ends of the mounting rods being of a shape other than a loop, such as a rectangular box. Also, the pole receiving member could consist of an aperture formed centrally through the base for permitting a pole to snugly pass therethrough, rather than a cylindrical member having a bored hole.

BRIEF DESCRIPTION OF THE DRAWINGS

The present invention will be further described with reference to the drawings appended hereto, wherein.

DETAILED DESCRIPTION

Figure 1:
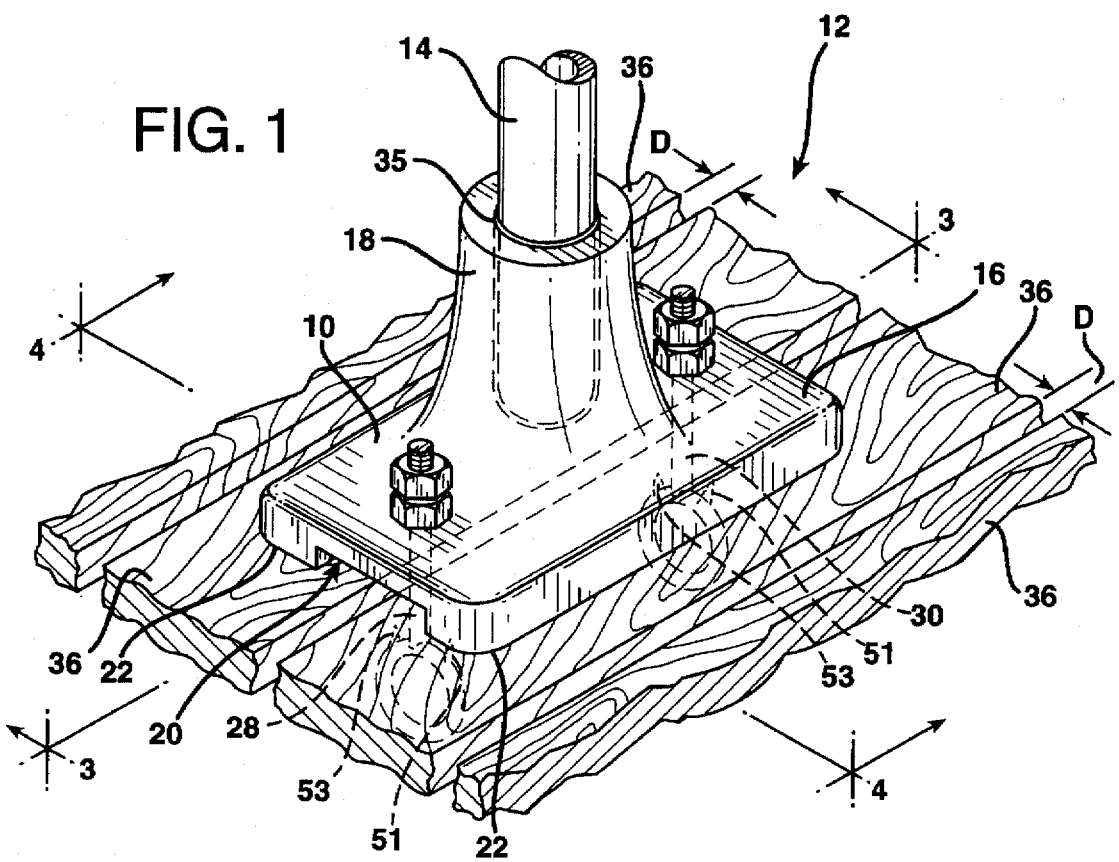
FIG. 1 is a perspective view of the present invention.

Referring now to the drawing figures there is seen in FIG. 1 an umbrella pole stand 10 mounted to a deck, denoted generally by reference numeral 12. The lower end of a deck umbrella pole 14 (fragmented) is shown extending upwardly from stand 10. The present invention will be referred to throughout as intended to mount umbrellas, however, it could be used to mount any pole supported furniture or decor.

Figure 5:
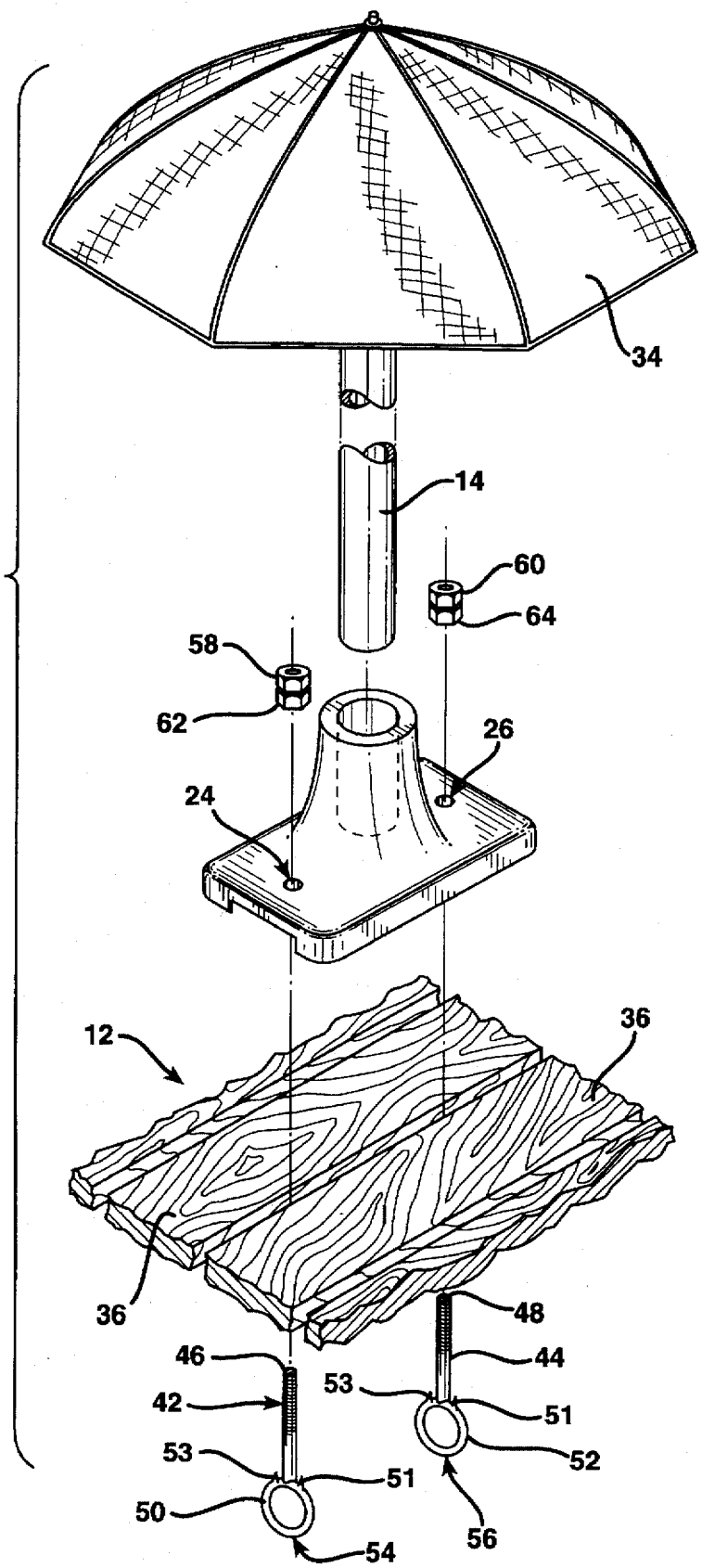
FIG. 5 is an exploded perspective view of the present invention.

Stand 10 is preferably fabricated from a strong, rigid plastic (metal composite materials could be used as well), and includes an upper surface 16 having a tapered, cylindrical, pole receiving member 18 integrally positioned centrally thereon and extending upwardly therefrom. Stand 10 further includes a bottom surface 20, of which at least the end portions 22 are co-planar with one another, and two laterally aligned apertures 24, 26 (see FIG. 5) formed therethrough on opposite sides of pole receiving member 18. Apertures 24, 26 are formed to cooperatively receive stand mounting rods 28, 30, respectively, therethrough.

Pole receiving member 18 includes a bored hole 32 formed therein for receiving pole 14. Hole's 32 diameter is slightly larger than the diameter of pole 18 to permit pole 18 to be force fit therein. The depth of hole 32 is sufficient to prevent a conventional deck umbrella 34 (see FIG. 5) from tipping over and falling out of stand 10. Bored hole 32 includes a compression joint fitting 35 positioned circumferentially around its upper lip to firmly hold pole 14. Pole receiving member 18 is also of sufficient dimensions to ensure stability of pole 14.

Deck 12 is comprised of a plurality of boards 36 aligned parallel to one another with a spacing, D, existing between adjacent boards 36. Boards 36 include planar upper and lower surfaces 38 and 40, respectively. Bottom ends 22 of stand 10 are placed in complete contacting relation to the upper surfaces 38 of two adjacent boards 36, as is most clearly seen in FIG. 4.

Figure 3:
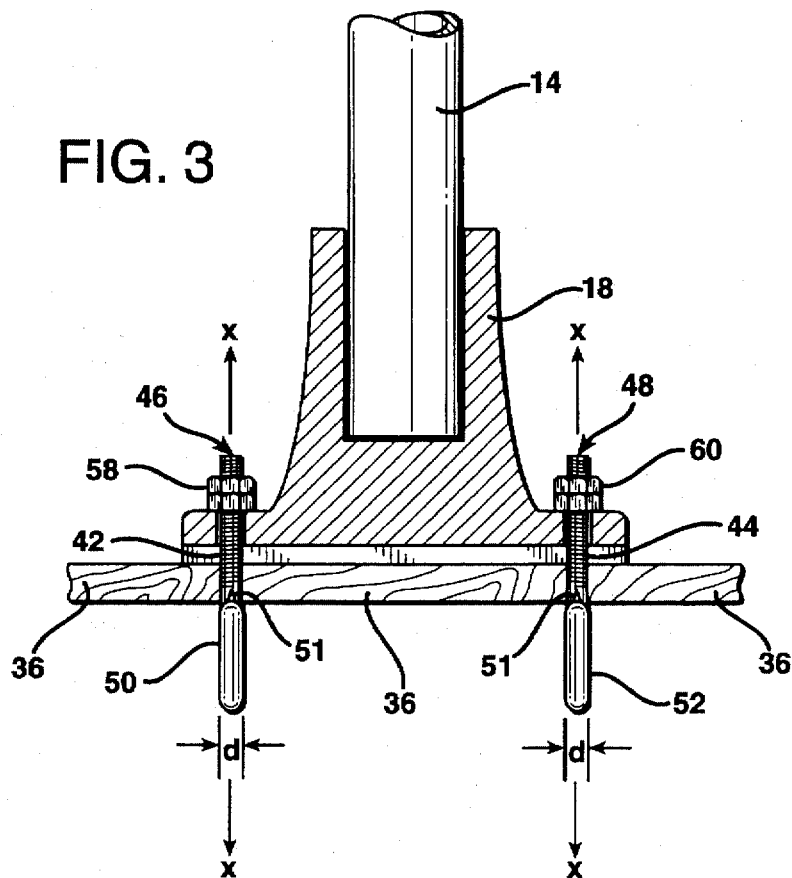
FIG. 3 is a cross-sectional view taken along line 3—3 of FIG. 1.
Figure 4:
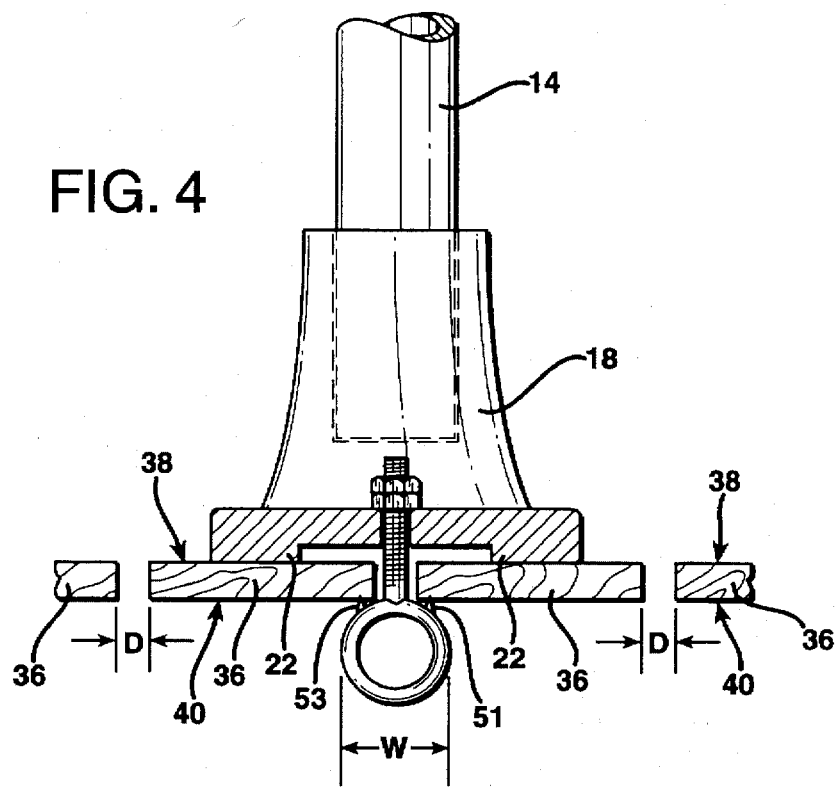
FIG. 4 is a cross-sectional view taken along line 4—4 of FIG. 1.

Mounting rods 28 and 30 include elongated, threaded shaft portions 42 and 44 which terminate in first ends 46 and 48, and further include ring, or loop, portions 50 and 52 integrally attached to shaft portions 42 and 44, respectively, which terminate in second ends 54 and 56. Rings 50 and 52 each include first and second burrs 51 and 53 integral therewith, one adjacently positioned on each side of rods 28 and 30. Burrs 51 and 53 penetrate the deck boards to secure the mounting. As shown in FIG. 3, rods 28 and 30 and rings 50 and 52 are of a thickness, d, which is smaller in dimension than the distance, D, separating adjacent boards 36. As seen in FIG. 4, rings 50 and 52 are of a width, W, which is greater in dimension than distance, D, separating adjacent boards 36.

To mount stand 10 to deck 12, first ends 46 and 48 are initially passed through apertures 24 and 26, respectively, and then securely attached to stand 10 by nuts 58 and 60, respectively. Nuts 58 and 60 prevent rods 28 and 30 from falling out of apertures 24 and 26, respectively. Mounting rods 28 and 30 are then arranged, and stand 10 is positioned, to permit ring portions 50 and 52 to pass through a common spacing between two, adjacent boards 36. Once ring portions 50 and 52 are fully through the spacing, first ends 46 and 48 should be grasped so as to rotate ring portions 50 and 52 approximately 90 degrees about the longitudinal axis, X—X, extending through mounting rods 28 and 30, thereby preventing stand 10 from being lifted away from deck 12 due to the interference between ring portions 50 and 52, and bottom surfaces 40 of boards 36. The tightening nuts 62 and 64, positioned between retaining nuts 58 and 60 and ring portions 50 and 52, respectively, may then be tightened until they firmly abut upper surfaces 38 of boards 36, and ring portions 50 and 52 firmly abut lower surfaces 40 of boards 36 with burrs 51 and 53 penetrating the boards. At this point, stand 10 is securely mounted to deck 12, and umbrella 34 will remain firmly in place despite gusty winds or other inclement weather.

To remove stand 10, nuts 58, 62 and 60, 64 are loosened; mounting rods 28 and 30 rotated about axis X—X to permit ring portions 50 and 52 to pass through the deck spacing; and stand 10 is moved as desired. To firmly reattach stand 10 to deck 12, the above mounting process is simply repeated. To slide stand 10 to a different position on deck 12, but on the same adjacent boards 36, nuts 58, 62 and 60, 64 are loosened, but there is no need to rotate mounting rods 28 and 30. After the nuts are loosened, stand 10 may be slid between the same boards. When repositioned as desired, nut 58, 62 and 60, 64 may then be tightened. Thus, there never arises a need for a user of stand 12 to manipulate attachment devices from below the deck's surface, nor do they need to lift extraordinarily heavy apparatus.

Figure 2:
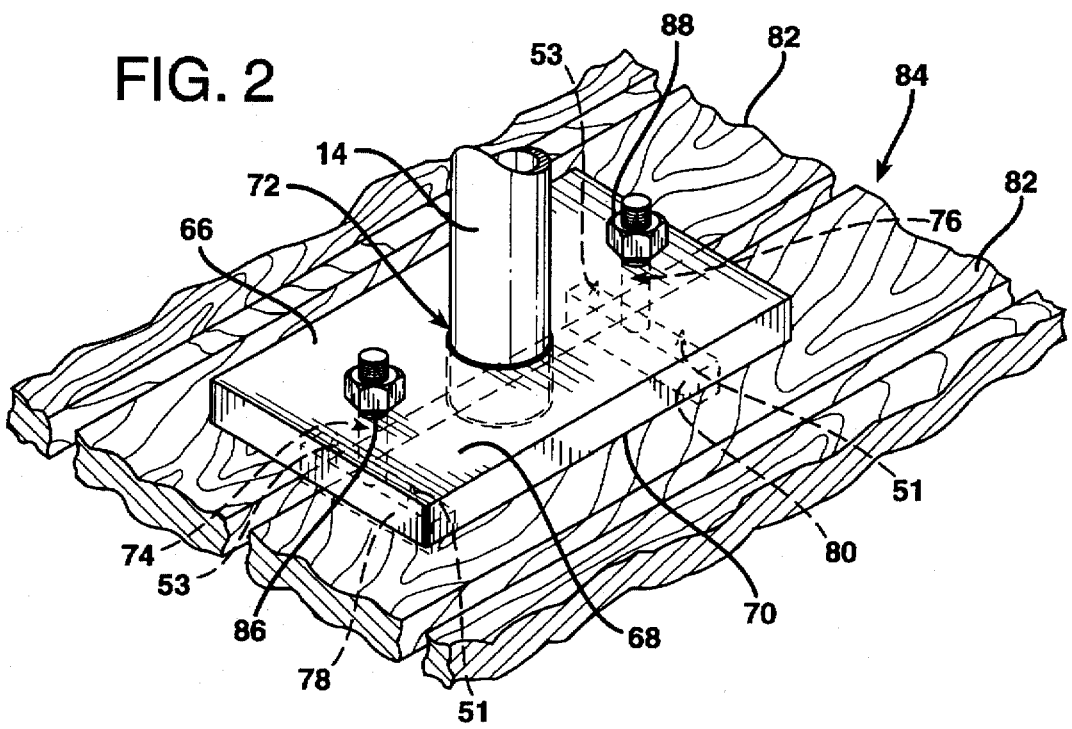
FIG. 2 is a perspective view of an alternate embodiment of the present invention.

Referring to FIG. 2 of the drawings, it is seen that the present invention would work equally well with some of the elements being slightly altered in shape. Stand 66 may include completely planar top and bottom surfaces 68 and 70, respectively. Pole receiving member could simply be an aperture 72 formed centrally through stand 66, and mounting rods 74 and 76 could include elongated blocks 78 and 80 as opposed to ring portions 50 and 52. Blocks 78 and 80 are understood to be of a thickness smaller than the distance, D, between adjacent boards 82, and a width greater than the distance, D. Also, mounting rods 74 and 76 could be securely retained on stand 66 and firmly secure stand 66 to deck 84 by one nut 86 and 88 on each rod, as opposed to two nuts 58, 62, and 60, 64 on the preferred embodiment.

Figure 6:
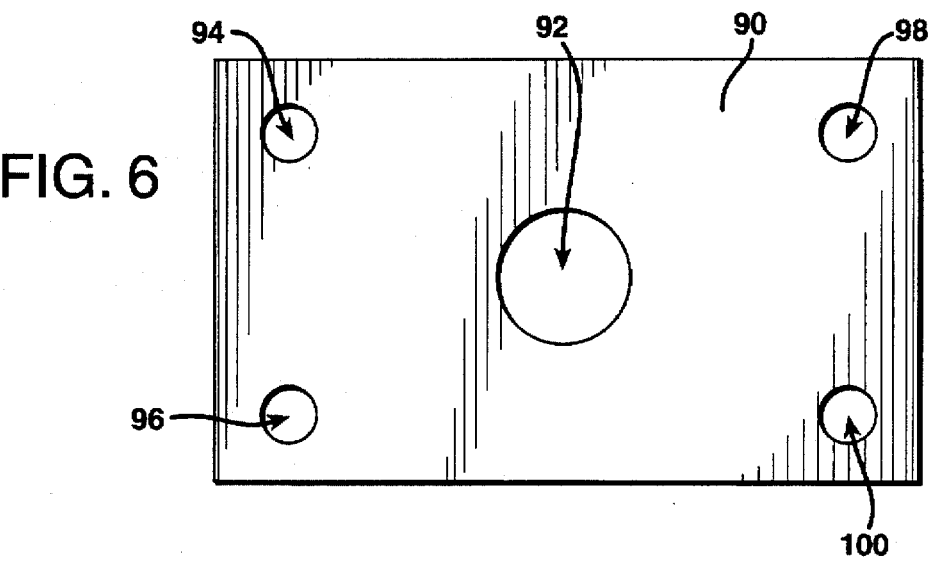
FIG. 6 is a bottom plan view of a third, alternate embodiment of the present invention.

Referring now to another alternate embodiment of the present invention, there is seen in FIG. 6, a stand 90 having a pole receiving aperture (or member) 92 formed centrally therethrough, and includes a total of four apertures 94, 96, 98 and 100 formed adjacent to the corners of stand 90 which are adapted to receive mounting rods therethrough. The extra apertures (and hence extra mounting rods) provide added stability to stand 90, as compared to the earlier described embodiments. The method for mounting stand 90 to a deck is identical to the earlier described stand mounting methods.

Figure 7:
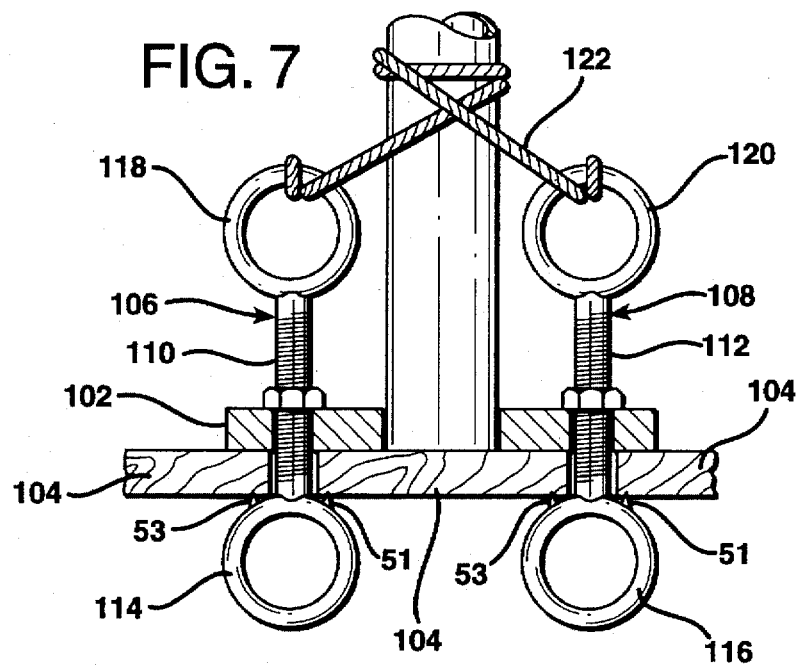
FIG. 7 is a front elevational view of a fourth, alternate embodiment of the present invention.
Figure 8:
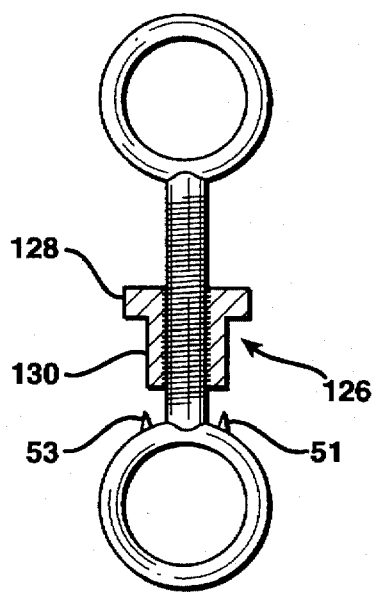
FIG. 8 is a partial, cross-sectional view of the mounting rod and threaded spacer elements of the embodiment illustrated in FIG. 7.
Figure 9:
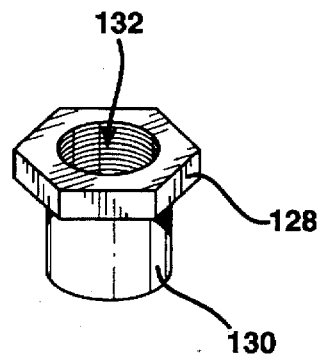
FIG. 9 is a perspective view of the threaded spacer element of the embodiment illustrated in FIG. 7.

Referring now to FIGS. 7–9, there is seen a stand 102 which is substantially identical to earlier described stand 66. However, stand 102 is securely retained on deck boards 104 by mounting rods 106 and 108 which are different from the earlier described mounting rods. Mounting rods 106 and 108 include threaded shaft portions 110 and 112, respectively, and first ring portions 114 and 116, respectively, integrally formed on their bottom ends as to the other rods, but rods 106 and 108 also include second ring portions 118 and 120, respectively, attached to their upper ends second ring portions 118 and 120 may be attached to the upper ends. Second ring portions 118 and 120 may be attached to the upper ends of rods 106 and 108, respectively, in any desired manner.

A strand(s) of rope 122 is provided which may be drawn, or laced, through rings 118 and 120. Once drawn through, and after rods 106 and 108 have securely retained stand 102 to boards 104, rope 122 may be wrapped and tied around pole 124, thereby providing further stability to the arrangement.

As shown in FIGS. 8 and 9, mounting rods 106 and 108, or any of the other mounting rods, could be securely attached to stand 103 by means of a threaded spacer 126, as opposed to a conventional nut as is shown in the other embodiments. Thumb screw 126 includes a hex-head 128, a shaft portion 130, and an internally threaded hole 132 formed therethrough. Shaft portion 130 positions hex-head 128 a predetermined distance above stand 102 when in abutting relation to stand 102, thereby providing easier user manipulation of screw 126 as compared to the nuts shown in the other embodiments.

Figure 10:
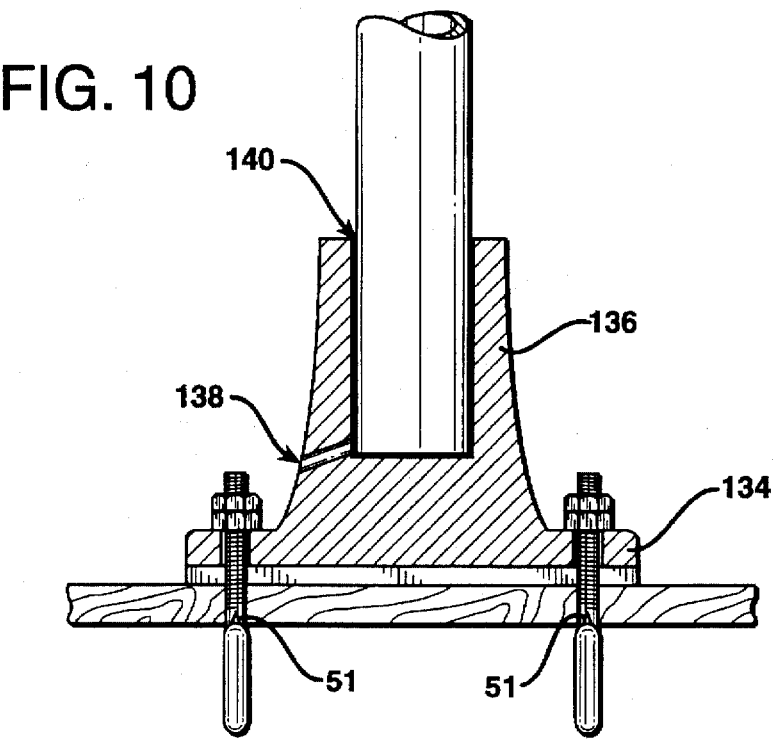
FIG. 10 is a front elevational view of a fifth, alternate embodiment of the present invention.

FIG. 10 shows a stand 134 with a pole receiving member 136 extending centrally, upwardly therefrom, substantially identical to stand 10. However, pole receiving member 136 includes a hole 138 extending in a downwardly sloping direction from adjacent the bottom of bored hole 140 (formed in member 136), through member's 136 sidewall, to the exterior. Hole 138 provides drainage means for stand 134, thereby not permitting any water to accumulate within bored hole 140.

Figure 11:
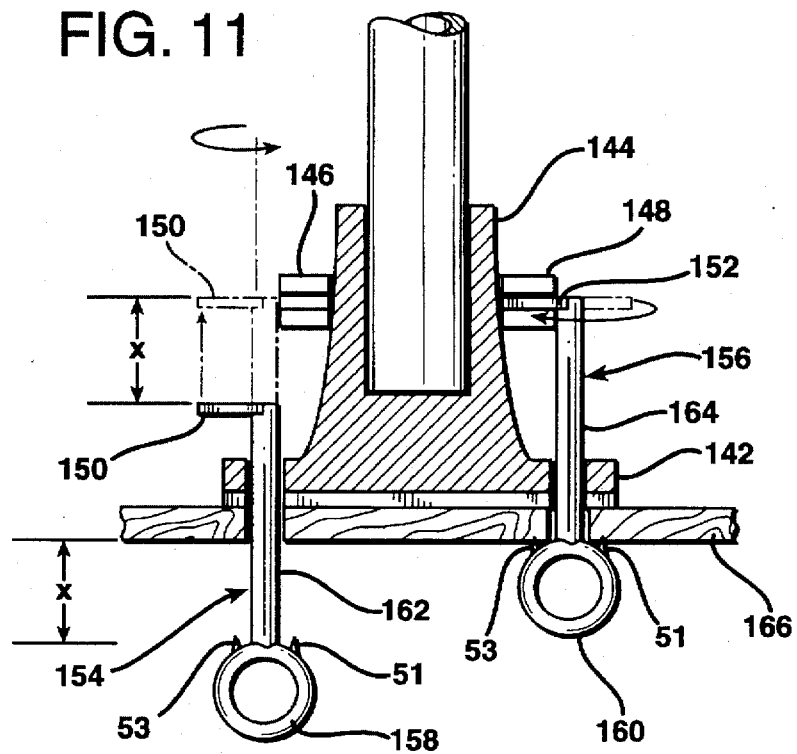
FIG. 11 is a front elevational view of a sixth, alternate embodiment of the present invention.

FIG. 11 shows yet another embodiment of the present invention. A stand 142 includes a centrally, upwardly extending pole receiving member 144, again, substantially identical to stand 10. Attached to opposite sides of the sidewall of member 144 are two, conventional C-clips 146 and 148. C-clips 146 and 148 are adaptively formed to cooperatively receive horizontally disposed, handle members 150 and 152, respectively, which are attached to the upper ends of stand mounting rods 154 and 156, respectively. Handle members 150 and 152 may be attached to the upper ends of rods 154 and 156, respectively, in any desired manner. For instance, Mounting rods 154 and 156 further include ring portions 158 and 160 integrally formed on their lower ends, respectively, and non-threaded, elongated shaft portions 162 and 164, respectively. Since nuts are not used in this embodiment, there is no need for shaft portions 162 and 164 to be threaded.

To mount stand 142 on boards 166, handles 150 and 152 are grabbed by the user, mounting rods 154 and 156 are pulled upwardly, and when handles 150 and 152 are laterally aligned with C-clips 146 and 148, mounting rods 154 and 156 are rotated about their respective longitudinal axis, and handles 150 and 152 are lockingly snapped into engaging relation with C-clips 146 and 148, respectively. As is shown in FIG. 11, the distance x between the bottom of boards 166 to the bottom end of shaft portions 162 and 164 is equal to the distance X between handles 150 and 152 and C-clips 146 and 148. The distance x is preferably the length necessary to accommodate boards 2" thick.

Although several different embodiments show changes to the various elements that comprise the present invention, the various mounting rods, retaining means (thumb screw or nuts), and pole receiving members could be used interchangeably. Thus, the present invention should not be limited to the precise embodiments as described herein and equivalents thereof, but should extend to the full scope as defined by the appended claims.

What is claimed is:

1. A stand for removably mounting furniture supported on a pole to a deck having at least two boards of first predetermined thickness and which include upper and lower, planar surfaces, said at least two boards extending in parallel relation to one another and spaced apart by a first predetermined distance, said stand comprising:

a) a base portion of predetermined thickness having an upper surface and a lower surface at least a part of which is adapted to be positioned in contacting relation to said upper surfaces of said at least two boards, said base portion further including a continuous edge defined by a predetermined periphery and being of predetermined thickness, pole receiving means substantially centrally positioned on said upper surface, and at least first and second apertures formed through said base portion and positioned adjacent said predetermined periphery;

b) at least first and second elongated, stand mounting rods extending through said at least first and second apertures, respectively, said at least first and second rods of predetermined length each including a threaded shaft portion extending along a linear axis, said rods terminating in first and second ends;

c) said second end being of a shape extending along an axis offset from said linear axis, and having a first predetermined width greater than said first predetermined distance and a second predetermined thickness less than said first predetermined distance, wherein said stand may be mounted to said deck with said first end extending through one of said at least first and second apertures and is positioned adjacent said stand's upper surface, and said second end extends through said space between said at least two boards and is positioned adjacent said boards' lower surfaces; and d) at least a first retaining means adapted to threadingly engage each of said threaded, shaft portions of said at least first and second stand mounting rods.

2. The invention according to claim 1 wherein said second end of said at least first and second stand mounting rods is shaped in the form of a loop.

3. The invention according to claim 1 wherein said pole receiving member is cylindrically shaped and extends upwardly from said stand's upper surface, and includes a bored hole formed therein for cooperatively receiving said pole.

4. The invention according to claim 1 wherein said pole receiving member is an aperture formed substantially centrally through said stand, said aperture being of sufficient diameter to permit said umbrella pole to be force fit therethrough.

5. The invention according to claim 1 wherein said retaining means is a nut.

6. The invention according to claim 1 wherein said retaining means is a thread spacer.

7. A method for mounting a stand to a deck, said stand having a base portion which includes an upper surface, lower surface, a continuous edge, a pole receiving member extending upwardly from said upper surface, and at least first and second longitudinal rods for removably, securely attaching said stand for said deck, said rods including a threaded shaft portion, extending along a longitudinal axis and a non-linear shaped portion integral with said shaft portion, said deck including at least first and second boards extending in spaced, parallel relation to one another, said method comprising the steps of:

a) placing said stand in straddling relation to said at least two boards;

b) passing said rods through said spacing between said at least two boards until said non-linear portions are positioned beneath said first and second boards;

c) rotating said rods between 45–135 degrees about their longitudinal axes; and d) tightening a nut engaged on said threaded shaft portion until said non-linear ends of said mounting rods securely abut said lower surfaces of first and second boards.

8. A stand for removably mounting furniture supported on a pole to a deck having at least two boards of predetermined thickness and which include upper and lower, planar surfaces, said at least two boards extending in parallel relation to one another and spaced apart by a first predetermined distance, said stand comprising:

a) a base portion of predetermined thickness having an upper surface and a lower surface at least a part of which is adapted to be positioned in contacting relation to said upper surfaces of said at least two boards, said base portion further including a continuous edge defined by a predetermined periphery and being of predetermined thickness, pole receiving means substantially centrally positioned on said upper surface, and at least first and second apertures formed through said base portion and positioned adjacent said predetermined periphery;

b) at least first and second elongated, stand mounting rods extending through said at least first and second apertures, respectively, said at least first and second rods of predetermined length each including a threaded shaft portion extending along a linear axis, said rods terminating in first and second ends;

c) said second end being of a shape extending along an axis offset from said linear axis, and having a first predetermined width greater than said first predetermined distance and a second predetermined thickness less than said first predetermined distance, wherein said stand may be mounted to said deck with said first end extending through one of said at least first and second apertures and positioned adjacent said stand's upper surface, and said second end extending through said space between said at least two boards and positioned adjacent said boards' lower surfaces; and d) an arm fixedly attached to said first end of said rod and extending perpendicularly therefrom; and e) a clip member attached to said pole receiving member and positioned to adaptively, lockingly receive said arm, wherein said arm may be moved into or out of locked engagement with said clip member.

9. The invention according to claim 8 wherein said second end of said at least first and second stand mounting rods is shaped in the form of a loop.

10. The invention according to claim 8 wherein said pole receiving member is cylindrically shaped and extends upwardly from said stand's upper surface, and includes a bored hole formed therein for cooperatively receiving said pole.

11. A stand for removably mounting furniture supported on a pole to a deck having at least two boards of predetermined thickness and which include upper and lower, planar surfaces, said at least two boards extending in parallel relation to one another and spaced apart by a first predetermined distance, said stand comprising:

a) a base portion of predetermined thickness having an upper surface and a lower surface at least a part of which is adapted to be positioned in contacting relation to said upper surfaces of said at least two boards, said base portion further including a continuous edge defined by a predetermined periphery and being of predetermined thickness, pole receiving means substantially centrally positioned on said upper surface, and at least first and second apertures formed through said base portion and positioned adjacent said predetermined periphery;

b) at least first and second elongated, stand mounting rods extending through said at least first and second apertures, respectively, said at least first and second rods of predetermined length each including a threaded shaft portion extending along a linear axis, said rods terminating in first and second ends;

c) said second end being of a shape extending along an axis offset from said linear axis, and having a second predetermined width greater than said first predetermined distance and a second predetermined thickness less than said first predetermined width, whereby said stand may be mounted to said deck with said first end extending through one of said at least first and second apertures and positioned adjacent said stand's upper surface, and said second end extending through said space between said at least two boards and positioned adjacent said boards' lower surfaces;

d) said first end of each of said at least two rods having a second looped member fixedly attached thereto;

e) at least one strand of rope, whereby said strand of rope may be drawn through said second looped member and tied to said pole for securely retaining said furniture to said stand; and f) at least a first retaining means adapted to threadingly engage each of said threaded, shaft portions of said at least first and second stand mounting rods.

12. The invention according to claim 11 wherein said second end of said at least first and second stand mounting rods is shaped in the form of a loop.

13. The invention according to claim 11 wherein said pole receiving member is cylindrically shaped and extends upwardly from said stand's upper surface, and includes a bored hole formed therein for cooperatively receiving said pole.

14. The invention according to claim 11 wherein said pole receiving member is an aperture formed substantially centrally through said stand, said aperture being of sufficient diameter to permit said umbrella pole to be force fit therethrough.

15. The invention according to claim 11 wherein said retaining means is a nut.

16. The invention according to claim 11 wherein said retaining means is a threaded spacer.

* * * * *

UNITED STATES PATENT AND TRADEMARK OFFICE
CERTIFICATE OF CORRECTION

PATENT NO. : 5,685,517
DATED : Nov. 11, 1997
INVENTOR(S) : Joseph Salibra

It is certified that error appears in the above-indentified patent and that said Letters Patent is hereby corrected as shown below:

Title page, item [54] and Col. 1,
In The Title: delete "SUPPROTED" and substitute therefor --SUPPORTED--.

On the title page; add George R. McGuire as attorney, agent or firm.

Signed and Sealed this

Twenty-eighth Day of July, 1998

Attest:

BRUCE LEHMAN

*Attesting Officer*    Commissioner of Patents and Trademarks